Figure 1:
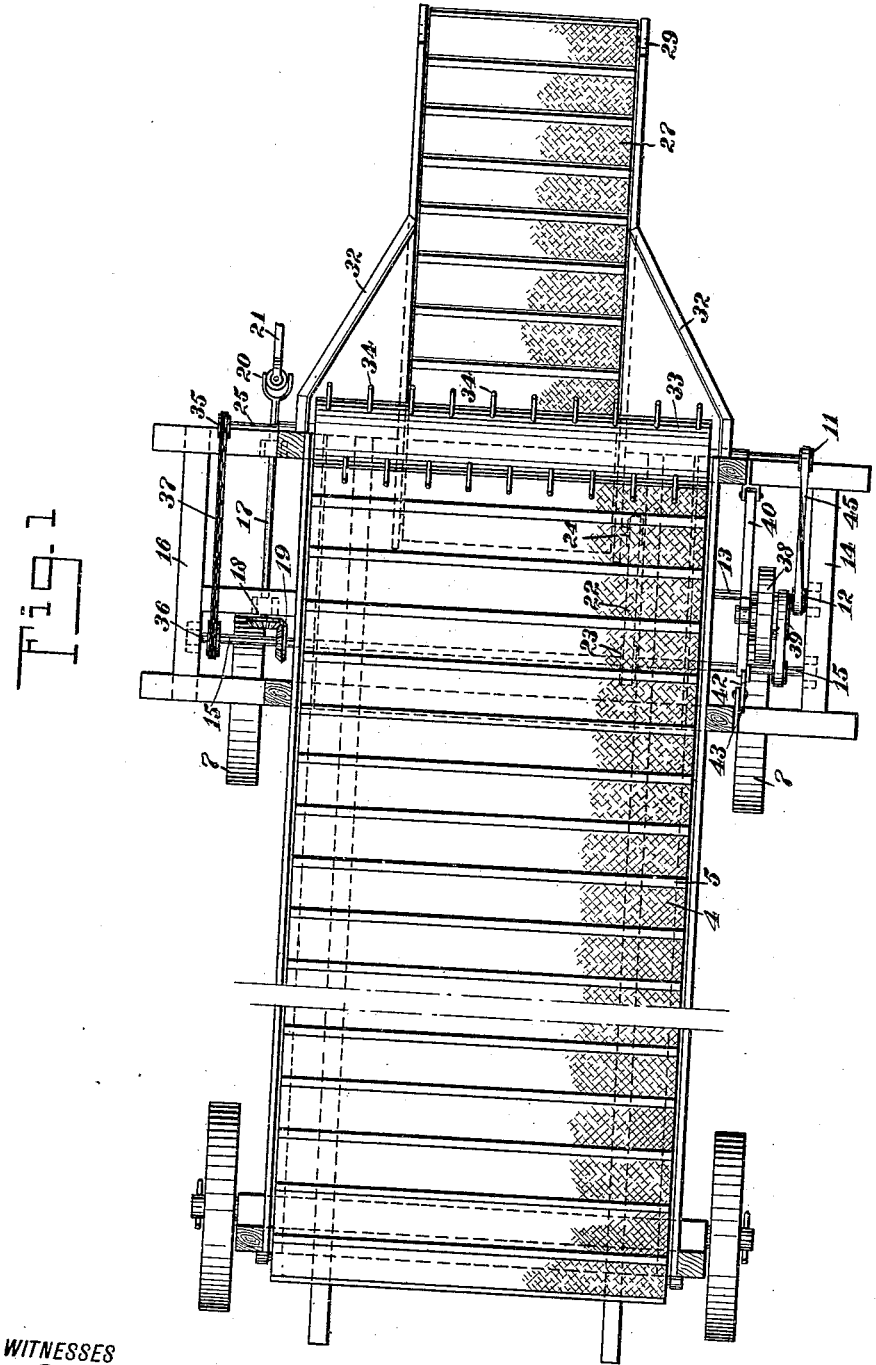

H. J. BOYER.
THRESHING MACHINE FEEDER.
APPLICATION FILED JUNE 9, 1909.

955,046.

Patented Apr. 12, 1910.
2 SHEETS—SHEET 1.

WITNESSES
J. H. Brophy
J. P. Davis

INVENTOR
Henry J. Boyer
BY Munn & Co
ATTORNEYS

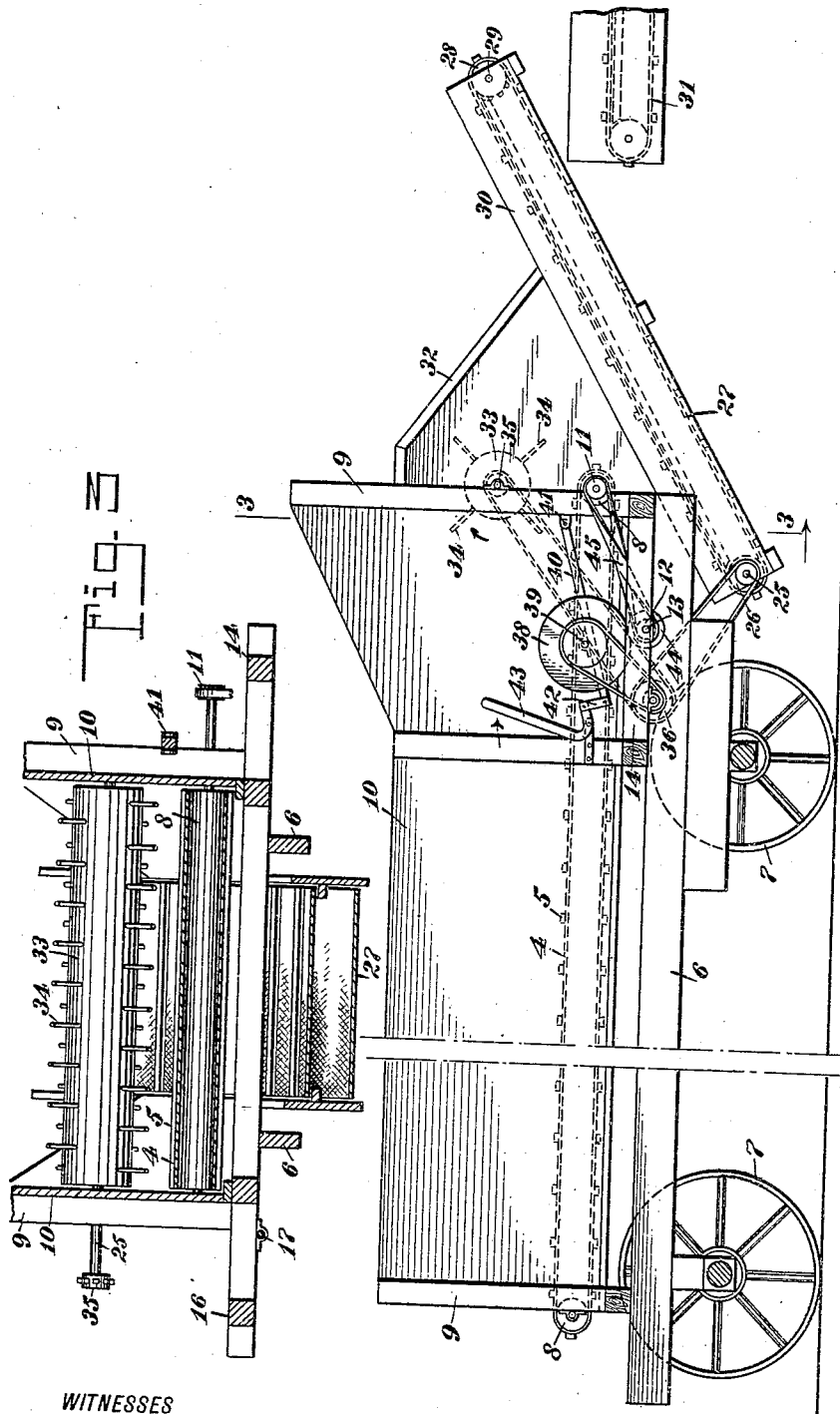

UNITED STATES PATENT OFFICE.

HENRY J. BOYER, OF VOLLMER, IDAHO.

THRESHING-MACHINE FEEDER.

955,046.

Specification of Letters Patent. Patented Apr. 12, 1910.

Application filed June 9, 1909. Serial No. 501,026.

*To all whom it may concern:*

Be it known that I, HENRY J. BOYER, a citizen of the United States, and a resident of Vollmer, in the county of Nez Perce and State of Idaho, have invented a new and Improved Threshing-Machine Feeder, of which the following is a full, clear, and exact description.

This invention has for its principal objects: to provide a spreading and feeding table for delivering to the draper of a threshing machine the grain-bearing straw to be threshed; to provide a portable spreading and feeding table adapted to deliver the straw upon the draper of the threshing machine as and when extended in opposite directions from the threshing machine; and to provide a mechanism wherein the construction and arrangement are simplified.

One embodiment of the present invention is disclosed in the construction illustrated in the accompanying drawings, wherein like characters of reference indicate corresponding parts in all the views.

Figure 1 is a plan view of the machine as constructed in accordance with the present invention; Fig. 2 is a side elevation of the same; and Fig. 3 is a sectional view of the delivery end of the machine, the section being taken on the line 3—3 in Fig. 2.

In the present invention I substitute for the stationary platform a moving platform or apron 4 constructed of any suitable material; that shown in the drawings being a heavy duck or canvas. It forms a flexible belt-like structure upon the surface of which is mounted transversely a series of bars, which engage and carry forward the straw received upon the apron 4. If desired, the bars 5 may be provided with teeth vertically disposed along the said bars.

At each end of a portable frame 6, which is suitably mounted upon wheels 7—7, are mounted drums 8—8. In this instance I provide on the shaft of the drums 8—8, suitable sprockets to engage and move the said sprocket chains. The shafts for the drums 8—8 are mounted in suitable bearings on the stanchions 9—9 mounted at each end of the frame 6, and forming the end members of the sides 10. The apron 4 extends completely across the structure between the sides 10—10.
The apron 4 is propelled by a driving mechanism connected to the shaft of the drum 8 placed in the forward end of the frame 6. Fixedly mounted on this shaft is a driving pulley 11 whereby the rotary action of the drums 8—8 is imparted. The pulley 11 is connected to a pulley 12 which is fixedly mounted upon a shaft 13 extended between and mounted upon an offset framing beam 14. The framing beam 14 forms a similar bearing for a shaft 15 which is extended between the frame 14 on the one side and the frame 16 on the other side of the construction. The shaft 15 is connected to a shaft 17 through the bevel gears 18 and 19 which are mounted, the one on the shaft 17 and the other on the shaft 15 respectively. The gears 18 and 19 being in toothed engagement, whatever rotation is imparted to the shaft 17 is likewise transmitted through the two gears 18 and 19 to the shaft 15. The shaft 17 is connected through a knuckle 20 with a transmission shaft 21, and the latter is connected directly with a rotary member of the threshing machine.

While I have shown and described the connection between the shaft 15 of the present device and the threshing machine, as through the transmission gears consisting of the knuckle 20 and the shafts 17 and 21, I do not wish to confine myself to such construction, as any well known form of transmission gearing which will impart the necessary rotation to the shaft 15 from the rotary members of the threshing machine, will answer the purpose of this construction.

The shaft 15 is connected through a belt 22 and pulleys 23 and 24 with a shaft 25 which mounts a drum 26, over which is extended a second apron 27. The apron 27 is constructed in most respects similar to that designated as the apron 4. It is inclined as shown in Fig. 2 of the drawings, and is at the upper end passed around a drum 28, mounted upon a shaft 29 at the upper and outer end of a frame 30, said frame being of less width than the apron 4. Between the frame 30 and the stanchion 9 are built hopper-like sides or cheek pieces 32 which form guides for the straw, and at the same time form structural supports for the frame 30.

With a structure formed and arranged as thus far described, the action is as follows: The apron 4 is driven steadily toward the forward end of the platform by the driving mechanism just described. As the straw is delivered at the front end, it would be delivered as received by the apron 4 directly upon the apron 27 providing there be no interposed separator. With the interposed separator which I will hereafter describe, the amount of the straw which passes over on the apron 4 is regulated, and this is delivered upon the upper side of the apron 27.

Through the mechanism described, the same rotary action is produced in the drums carrying the apron 27 as is produced in the drums carrying the apron 4. This results in an action on the part of the aprons 4 and 27 to advance on the one the material in the horizontal plane to the rear end of the device and deliver the material on to the apron 27 which travels in the same general direction but up an inclined plane where it is extended over the draper 31 of the threshing machine. As the material is received on the draper 31 of the threshing machine it is advanced by said draper and delivered to the threshing machine.

Located above the inner end of the apron 4 is a rotary drum 33 extended from which are tines 34 formed in various lengths. The drum 33 is rotated in the direction shown by the arrow in Fig. 2 of the drawings, by means of the connection between the sprocket wheel 35 on the shaft mounting the drum 33 and a sprocket wheel 36 mounted on the shaft 15 through a sprocket chain 37.

The advancement of the apron 4 bearing the bulk of the material being fed, is controlled to move intermittently. This is accomplished by the interposition of a friction wheel 38 which is mounted on a shaft 39 having bearings in a pivoted frame 40. The frame 40 is pivotally mounted at 41 upon the stanchion 9, and the free end thereof is pivotally connected by means of a link 42 with a lever 43. The lever 43 is so disposed that when drawn in the direction indicated by the arrow in Fig. 2, the wheel 38 is depressed to make frictional contact with a small wheel 44 which drives the shaft 13 and with it the pulley 12. The pulley 12 is connected by means of a belt 45 to the pulley 11 and drum 8. The shaft 39 has a pulley 46 to receive a belt 47 to transmit the rotary motion from the shaft 15 to the shaft 39. In this position of the wheel 38 the drums 8 mounted on the stanchions 9—9 are rotated so as to advance the apron 4. When, however, the lever 43 is drawn backward, to raise the wheel 38 from engagement with the wheel 44, the shaft 13 and drum 8 cease to rotate and the apron 4 is arrested in its forward motion, and in this manner the material being fed upon the apron 27 is regulated. Should it prove that the straw is being delivered too rapidly upon the end of the draper 31 of the threshing machine, this can be corrected by raising the wheel 38 out of engagement with the wheel 44, whereupon the advance of the load ceases.

The rotation of the drum 33 is such that when the straw is delivered to it, the straw is raised and delivered upon the apron 27 over the drum 33. The tines 34—34 operate upon the straw to separate the same and to deliver it upon the apron 27 in a more even manner than it is now delivered by hand. The tines 34 do not reach the bars 5 on the apron 4, and a certain proportion of the material contained on the said apron 4 is delivered over the end of the same directly upon the apron 27.

When throwing the straw as described, there would be some danger of part of it escaping and falling to either side of the narrow apron 27 if it were not for the side pieces 32 which, being spread as shown in Fig. 1 of the drawings, are in a position to guide the material when delivered from the drum 33 on to the apron 27.

Having thus described my invention, I claim as new and desire to secure by Letters Patent:

1. A threshing machine feeder comprising a frame mounted on carrying wheels, vertical sides for said frame, having vertical extensions at the delivery end of the said feeder, a conveyer longitudinally disposed between said sides; driving rollers mounted between said sides to support said conveyer, a frame mounted in an inclined position, having a narrower width than the said conveyer and having framing sides connected to the said vertical sides by guide sections; a second conveyer rotatably mounted in said inclined frame, a drum rotatably mounted on said vertical sides and provided with tine-like members extended to near the said conveyer at the delivery end thereof; a driving mechanism to move the said first-mentioned conveyer from the receiving to the delivery end of the feeder; a driving mechanism to move the said second-mentioned conveyer from the lower receiving to the upper delivery end of the said inclined frame; and a driving mechanism to so rotate the said drum that the tines on the lower side thereof are moved against the advanced material to raise the same over the said drum.

2. A threshing machine feeder comprising a frame mounted on carrying wheels, vertical sides for said frame, having vertical extensions at the delivery end of the said feeder, a conveyer longitudinally disposed between said sides; driving rollers mounted between said sides to support said conveyer, a frame mounted in an inclined position, having a narrower width than the said conveyer and having framing sides connected to the said vertical sides by guide sections; a second conveyer rotatably mounted in said inclined frame, a drum rotatably mounted on said vertical sides and provided with tine-like members extended to near the said conveyer at the delivery end thereof; a driving mechanism to move the said first-mentioned conveyer from the receiving to the delivery end of the feeder; a driving mechanism to move the said second-mentioned conveyer from the lower receiving to the upper delivery end of the said inclined frame; a driving mechanism to so rotate the said drum that the tines on the lower side thereof are moved against the advanced material to raise the same over the said drum; and means for at will arresting the said first-mentioned conveyer.

In testimony whereof I have signed my name to this specification in the presence of two subscribing witnesses.

HENRY J. BOYER.

Witnesses:
   H. E. YASTE,
   W. O. PERSONS.